(12) United States Patent
Liu

(10) Patent No.: US 10,292,094 B2
(45) Date of Patent: *May 14, 2019

(54) NETWORK ACCESS METHOD AND MOBILE COMMUNICATION TERMINAL

(71) Applicant: GUANGDONG OPPO MOBILE TELECOMMUNICATIONS CORP., LTD., Dongguan, Guangdong (CN)

(72) Inventor: Hai Liu, Dongguan (CN)

(73) Assignee: GUANGDONG OPPO MOBILE TELECOMMUNICATIONS CORP., LTD., Dongguan, Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/515,072

(22) PCT Filed: Mar. 31, 2016

(86) PCT No.: PCT/CN2016/078077
§ 371 (c)(1),
(2) Date: Mar. 28, 2017

(87) PCT Pub. No.: WO2016/173372
PCT Pub. Date: Nov. 3, 2016

(65) Prior Publication Data
US 2017/0215134 A1 Jul. 27, 2017

(30) Foreign Application Priority Data
Apr. 30, 2015 (CN) .......................... 2015 1 0217555

(51) Int. Cl.
*H04W 48/16* (2009.01)
*H04W 8/26* (2009.01)
(Continued)

(52) U.S. Cl.
CPC .......... *H04W 48/16* (2013.01); *H04B 1/3816* (2013.01); *H04W 8/12* (2013.01);
(Continued)

(58) Field of Classification Search
CPC ....... H04W 48/16; H04W 8/12; H04W 48/18; H04B 1/3816
See application file for complete search history.

(56) References Cited

U.S. PATENT DOCUMENTS

2004/0192306 A1* 9/2004 Elkarat ................... H04W 8/06
455/435.2
2004/0236702 A1* 11/2004 Fink ...................... G06Q 20/382
705/73
(Continued)

FOREIGN PATENT DOCUMENTS

CN 101031145 A 9/2007
CN 101103645 A 1/2008
(Continued)

OTHER PUBLICATIONS

Huawei et al., "The MDT applicability of Equivalent PLMN identities", 3GPP TSG-RAN WG3 Meeting #73, R3-111912, Aug. 26, 2011(Aug. 26, 2011), section 2.1.
(Continued)

*Primary Examiner* — Mehmood B. Khan
(74) *Attorney, Agent, or Firm* — Ladas & Parry LLP

(57) ABSTRACT

An embodiment of the present disclosure provides a network access method, including logging in to a shared server via a shared account, if a mobile communication terminal detects that a network identification of a PLMN of a visited place does not exist in a local memory; searching the shared network information in the shared server online via a network and acquiring the network identification of the PLMN of the visited place from the shared network infor-
(Continued)

mation, after the shared server is logged in to; adding the network identification of the PLMN of the visited place to an EPLMN list by the mobile communication terminal; and accessing a network according to the EPLMN list.

15 Claims, 6 Drawing Sheets

(51) Int. Cl.
*H04W 36/00* (2009.01)
*H04W 48/18* (2009.01)
*H04B 1/3816* (2015.01)
*H04W 8/12* (2009.01)

(52) U.S. Cl.
CPC .............. *H04W 8/26* (2013.01); *H04W 36/00* (2013.01); *H04W 48/18* (2013.01)

(56) References Cited

U.S. PATENT DOCUMENTS

| | | | | |
|---|---|---|---|---|
| 2005/0261970 | A1* | 11/2005 | Vucina | G06Q 20/20 705/16 |
| 2006/0211420 | A1* | 9/2006 | Ophir | H04W 8/20 455/432.1 |
| 2007/0259646 | A1 | 11/2007 | Hu et al. | |
| 2007/0287419 | A1* | 12/2007 | Wang | H04W 60/00 455/411 |
| 2009/0029698 | A1* | 1/2009 | Venkob | H04W 48/18 455/433 |
| 2010/0015978 | A1 | 1/2010 | Yoon et al. | |
| 2010/0267384 | A1* | 10/2010 | Dwyer | H04W 48/18 455/435.2 |
| 2010/0268674 | A1* | 10/2010 | Dwyer | H04W 36/0066 706/12 |
| 2012/0064883 | A1 | 3/2012 | Kim | |
| 2012/0243467 | A1 | 9/2012 | Vallurupalli et al. | |
| 2013/0053037 | A1* | 2/2013 | Jokinen | H04W 36/0066 455/436 |
| 2014/0031033 | A1* | 1/2014 | Juang | H04W 48/18 455/432.1 |
| 2014/0031035 | A1* | 1/2014 | Tagg | H04W 48/18 455/433 |
| 2014/0051423 | A1* | 2/2014 | Marsden | H04W 4/50 455/419 |
| 2014/0235241 | A1* | 8/2014 | Sharan | H04W 60/04 455/435.2 |
| 2014/0357263 | A1 | 12/2014 | Vallurupalli et al. | |
| 2015/0065132 | A1* | 3/2015 | Ramkumar | H04W 52/0241 455/435.3 |
| 2015/0141012 | A1* | 5/2015 | Ramkumar | H04W 48/20 455/435.3 |
| 2015/0256993 | A1* | 9/2015 | Bellamkonda | H04W 8/12 455/433 |

FOREIGN PATENT DOCUMENTS

| | | |
|---|---|---|
| CN | 101990279 A | 3/2011 |
| CN | 102100113 A | 6/2011 |
| CN | 103444233 A | 12/2013 |
| CN | 104853345 A | 8/2015 |

OTHER PUBLICATIONS

International Search Report dated Jun. 21, 2016 corresponding to International Application No. PCT/CN2016/078077.

* cited by examiner

NETWORK ACCESS METHOD AND MOBILE COMMUNICATION TERMINAL

CROSS REFERENCE TO RELATED APPLICATIONS

This application claims the priority of International Application No. PCT/CN2016/078077, filed Mar. 31, 2016, which claims the priority of Chinese Application No. 201510217555.6 filed Apr. 30, 2015 and titled "Network Access Method and Mobile Communication Terminal". The entire disclosures of the above applications are incorporated herein by reference.

BACKGROUND

Field

The present disclosure relates to a mobile terminal technology field, and more particularly to network access method and a mobile communication terminal.

Background

A public land mobile network (PLMN) is a network, which is established and operated by a government or an operator authorized by the government, for a purpose of providing land mobile communication services for the public. The network is usually interconnected with public switched telephone networks to establish a communication network in a region or a country.

Identification of a PLMN usually includes a series of digital codes. For instance, a network identification of a PLMN of the CHINA MOBILE is 46000, and a network identification of a PLMN of the CHINA UNICOM is 46001. Users can have convenient communications via mobile networks provided by operators. With the improvement of people's living, users travel or go on a business trip abroad with mobile communication terminals are more and more. When the users carry on roaming communications (e.g., international roaming communications), their mobile communication terminals (e.g., mobile phones) need to re-find networks to acquire a network identification of a PLMN.

When a mobile communication terminal is moved from a home place to a visited place (e.g., the mobile communication terminal roams from a home country to a visited country), the mobile communication terminal requires accessing to a PLMN of the currently visited place. However, when the mobile communication terminal is moved from the home place to the visited place, a situation that the mobile communication terminal takes a long time (sometimes needs to wait for tens of minutes) to successfully access to the PLMN of the currently visited place often occurs. This significantly affects the user's communication experiences.

SUMMARY OF THE DISCLOSURE

Embodiments of the present disclosure are to provide a network access method to solve the technical problem in the prior art. Before a mobile communication terminal is turned off or enters an airplane mode, a user can log in to a shared server via a shared account according to information of a visited place, acquire a visited public land mobile network (VPLMN) stored in the shared server, and adds the acquired VPLMN to an EPLMN list. When the mobile communication terminal performs a network searching in the visited place by using a registered public land mobile network (RPLMN), because the searched RPLMN is equivalent to the VPLMN, the mobile communication terminal can reside in the cell site and try to initiate a network registration process, thereby accelerating speed of the network searching.

To solve the above problem, in a first aspect in accordance with an embodiment of the present disclosure, a network access method is provided, including:

Logging in to a shared server via a shared account, if a mobile communication terminal detects that a network identification of a PLMN of a visited place does not exist in a local memory, wherein shared network information is stored in the shared server, and the network identification of the PLMN of the visited place is a network identification of an operator of the visited place, which signs a roaming agreement with an operator of a home place to which a subscriber identity module attached to the mobile communication terminal belongs;

Searching the shared network information in the shared server online via a network and acquiring the network identification of the PLMN of the visited place from the shared network information, after the shared server is logged in to;

Adding the network identification of the PLMN of the visited place to an EPLMN list by the mobile communication terminal, wherein the EPLMN list includes the network identification of the PLMN of the home place and the network identification of the PLMN of the visited place, and the network identification of the PLMN of the visited place is the network identification of the operator of the visited place, which signs the roaming agreement with the operator of the home place to which the SIM card attached to the mobile communication terminal belongs; and Accessing a network according to the EPLMN list.

In a second aspect in accordance with an embodiment of the present disclosure, a mobile communication terminal is provided, including:

A memory configured to store computer readable program codes; and

A processor configured to execute the computer readable program codes to perform the following operations:

Logging in to a shared server via a shared account, if it is detected that a network identification of a PLMN of a visited place does not exist in a local memory, wherein shared network information is stored in the shared server, and the network identification of the PLMN of the visited place is a network identification of an operator of the visited place, which signs a roaming agreement with an operator of a home place to which a subscriber identity module attached to the mobile communication terminal belongs;

Searching the shared network information in the shared server online via a network and acquiring the network identification of the PLMN of the visited place from the shared network information, after the shared server is logged in to;

Adding the searched network identification of the PLMN of the visited place to an EPLMN list, wherein the EPLMN list includes the network identification of the PLMN of the home place and the network identification of the PLMN of the visited place, and the network identification of the PLMN of the visited place is the network identification of the operator of the visited place, which signs the roaming agreement with the operator of the home place to which the SIM card attached to the mobile communication terminal belongs; and Accessing a network according to the EPLMN list.

In a third aspect in accordance with an embodiment of the present disclosure, a computer readable storage medium stored with computer readable program codes is provided, and the computer readable program codes are operated in a mobile communication terminal for:

Logging in to a shared server via a shared account, if it is detected that a network identification of a PLMN of a visited place does not exist in a local memory, wherein shared network information is stored in the shared server, and the network identification of the PLMN of the visited place is a network identification of an operator of the visited place, which signs a roaming agreement with an operator of a home place to which a subscriber identity module attached to the mobile communication terminal belongs;

Searching the shared network information in the shared server online via a network and acquiring the network identification of the PLMN of the visited place from the shared network information, after the shared server is logged in to;

Adding the searched network identification of the PLMN of the visited place to an EPLMN list, wherein the EPLMN list includes the network identification of the PLMN of the home place and the network identification of the PLMN of the visited place, and the network identification of the PLMN of the visited place is the network identification of the operator of the visited place, which signs the roaming agreement with the operator of the home place to which the SIM card attached to the mobile communication terminal belongs; and Accessing a network according to the EPLMN list.

In the technical schemes in accordance with the embodiments of the present disclosure, not only a network identification of a home PLMN of the mobile communication terminal but also an acquired network identification of a PLMN of an operator, which signs a roaming agreement with an operator of the home PLMN, is added to the EPLMN list. The PLMNs in the ELPMN list in which the network identifications are stored are regarded to be equivalent. As a result, a network of the mobile communication terminal can be accessed according to the EPLMN list because the network identifications of the PLMNs of operators of the visited places, which sign a roaming agreement with the operator of the home PLMN, are stored in the EPLMN list. Accordingly, when the mobile communication terminal is moved from a home place to a visited place and performs a network searching, possibility of matching with any one of the PLMNs in the EPLMN list storing the network identifications is significantly increased during the network searching. A success rate and speed can be increased when the mobile communication terminal is accessed to the network of the visited place. This is beneficial to shorten a user's waiting time significantly (in an ideal state, the mobile communication terminal may be accessed to the network within several seconds), thereby enhancing the user's communication experiences.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF THE PREFERRED EMBODIMENTS

Figure 1:
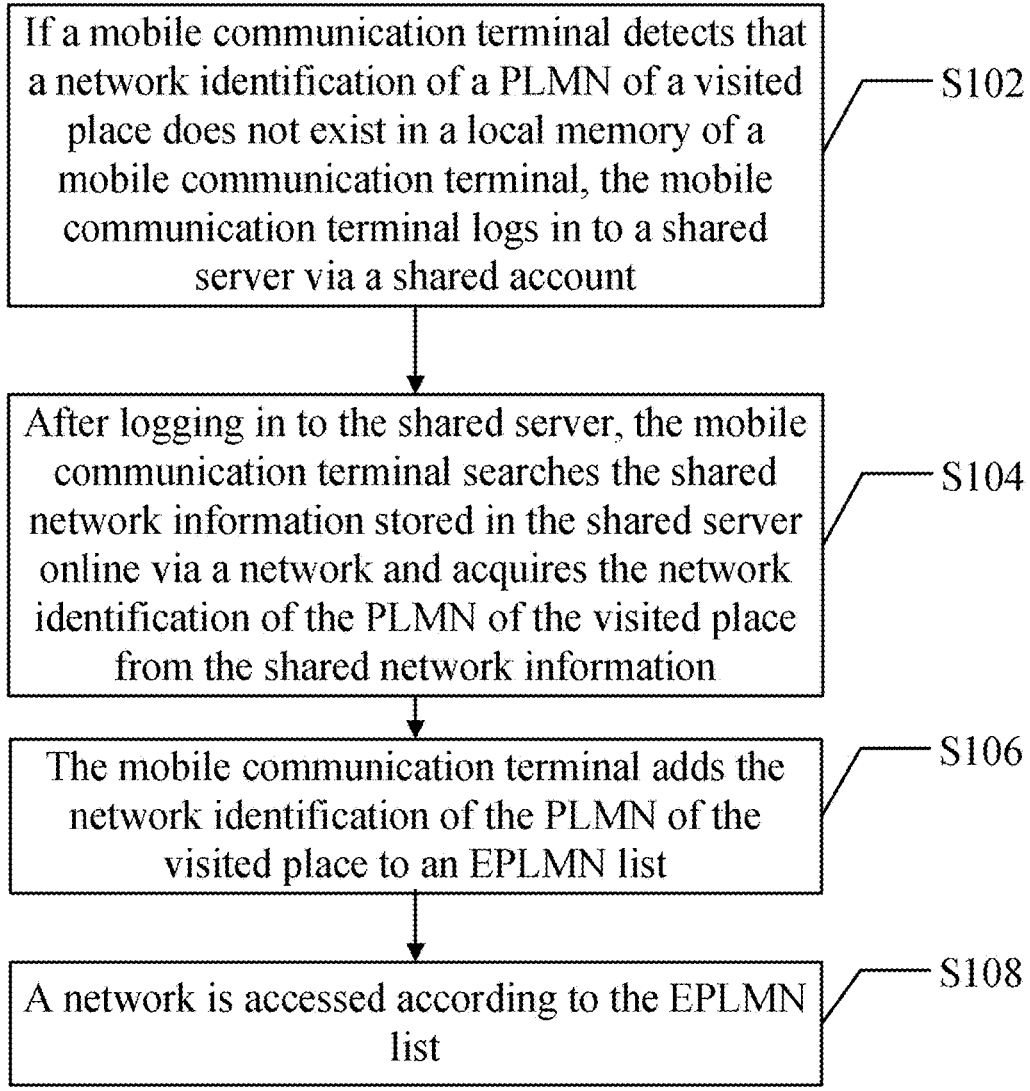
FIG. 1 is a schematic flowchart of an implementation manner of a network access method provided by an embodiment of the present disclosure.

A clear and complete description of technical solutions provided in the embodiments of the present disclosure will be given below, in conjunction with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

It is noted that the terms used in the embodiments of the present disclosure are merely for the purpose of illustrating specific embodiments, and are not intended to limit the present disclosure. The terms "a", "said" and "the" of singular forms used in the embodiments and the appended claims of the present disclosure are also intended to include plural forms, unless otherwise specified in the context clearly. It should also be understood that, the term "and/or" used herein indicates and includes any or all possible combinations of one or more associated listed items.

A public land mobile network (PLMN) is a network which is established and operated, by a government or an operator authorized by the government, for a purpose of providing land mobile communication services for the public. The network is usually interconnected with public switched telephone networks (PSTNs) to establish a communication network in a region or a country. PLMN=MCC+MNC. For instance, network identifications of PLMNs of the CHINE MOBILE include 46000, 46002, 46007, and 46008. Network identifications of PLMNs of the CHINE UNICOM include 46004, 46006, and 46009. A PLMN is a wireless communication system, which is oriented toward the land, e.g., users in transportation or in moving. However, users of mobile and portable internet are more and more. An ideal PLMN system provides the users of mobile and portable internet with the same services as a fixed network. This is a particular challenge in a complicated topographic region because a base station is difficult to be found and maintained. There are a lot of obstacles in the urban environment, such as buildings, and various types of radio frequency will cause radiation of noises and interferences.

A registered PLMN (RPLMN) is a PLMN which is registered before a mobile communication terminal is turned off or out of service. In the TSG TP-21 meeting in 2003, this parameter is decided to be deleted from a USIM and stored in a memory of the terminal.

An equivalent PLMN (EPLMN) is a PLMN which has status and priority equivalent to those of a current PLMN selected by the mobile communication terminal.

An equivalent home PLMN (EHPLMN) is a local PLMN which has status and priority equivalent to those of the current PLMN selected by the mobile communication terminal. Specifically, each of the EHPLMN and the EPLMN is such as a 158 network which is newly established by the CHINA MOBILE. The PLMN is such as one of existing 135~139 networks.

A home PLMN (HPLMN) is a home PLMN of a user of the mobile communication terminal. That is, MCC and MNC included in an IMSI of a USIM card of the mobile communication terminal are identical to MCC and MNC of the HPLMN. A user has only one home PLMN.

A visited PLMN (VPLMN) is a PLMN of a place which is visited by the user of the mobile communication terminal. MCC and MNC of the VPLMN are not identical to MCC and MNC stored in an IMSI of a SIM card. When the mobile communication terminal loses its coverage, a VPLMN is selected.

Please refer to FIG. 1, which is a schematic flowchart of an implementation manner of a network access method provided by an embodiment of the present disclosure. The method includes the following steps.

In step S102, if a mobile communication terminal detects that a network identification of a PLMN of a visited place does not exist in a local memory of a mobile communication terminal, the mobile communication terminal logs in to a shared server via a shared account. Shared network information is stored in the shared server. The network identification of the PLMN of the visited place is a network identification of an operator of the visited place, which signs a roaming agreement with an operator of a home place to which a subscriber identity module (SIM card) attached to the mobile communication terminal belongs. The network identification includes a network number.

Specifically, the mobile communication terminal may be a mobile phone. When the user travels or goes on a business trip abroad with the mobile communication terminal, a network of the mobile communication terminal enters an international roaming period. The visited place and the home place belong to different countries. The home place may be China, and the visited place may be, e.g., America or Korea. For instance, when the user travels with the mobile phone from China to America, the home place is China and the visited place is America. The network of the mobile phone is in an international roaming period. If the mobile communication terminal detects that the network identification of the PLMN of the visited place does not exist in the local memory of the mobile communication terminal, the mobile communication terminal can log in to the shared server via the shared account before reaching the visited place. The shared network information is stored in the shared server. The shared network information may include but not limited to HPLMN, EPLMN, and VPLMN. The network identification of the PLMN of the visited place is the network identification of the operator of the visited place, which signs the roaming agreement with the operator of the home place to which the subscriber identity module (SIM card) attached to the mobile communication terminal belongs. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009.

For instance, if it is detected that the PLMN does not exist in a local memory of a mobile phone, the mobile phone may log in to the shared server via the shared account. The shared network information is stored in the shared server.

In step S104, after logging in to the shared server, the mobile communication terminal searches the shared network information stored in the shared server online via a network and acquires the network identification of the PLMN of the visited place from the shared network information.

Specifically, after logging in to the shared server in step S102, the mobile communication terminal may search the shared network information stored in the shared server online via the network and acquires the network identification of the PLMN of the visited place from the shared network information. For instance, after the mobile phone logs in to the shared server via the shared account, the mobile phone may search the shared network information stored in the shared server online via the network. The mobile phone may acquire the VPLMN according to the searched shared network information.

In step S106, the mobile communication terminal adds the network identification of the PLMN of the visited place to an EPLMN list. The EPLMN list includes the network identification of the PLMN of the home place and the network identification of the PLMN of the visited place. The network identification of the PLMN of the visited place is the network identification of the operator of the visited place, which signs the roaming agreement with the operator of the home place to which the SIM card attached to the mobile communication terminal belongs.

Figure 2:
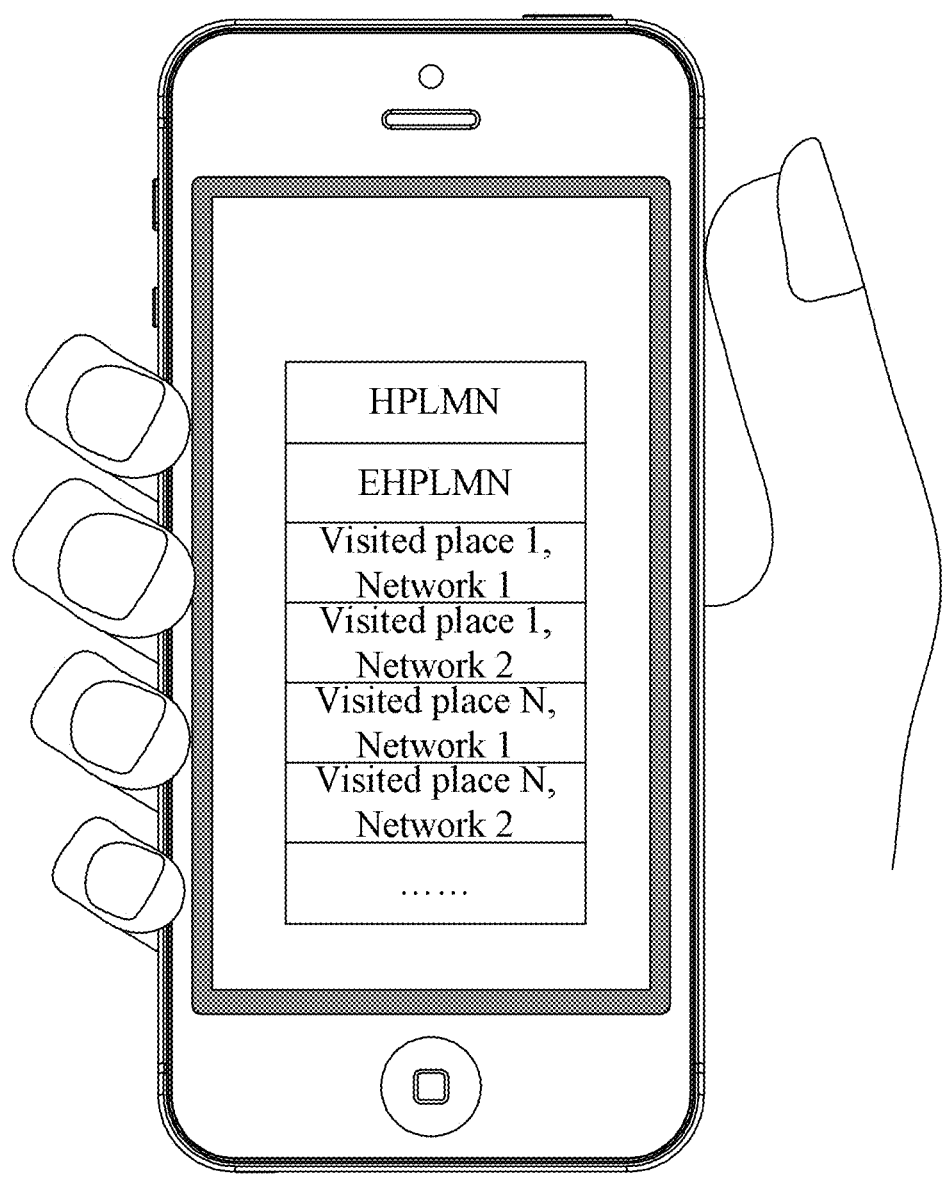
FIG. 2 is a schematic diagram of an implementation manner of an EPLMN list provided by an embodiment of the present disclosure.

Specifically, the network identification of the VPLMN acquired in step S104 may be added to the EPLMN list. A schematic diagram of the EPLMN list is shown in FIG. 2. The EPLMN is a PLMN which has status and priority equivalent to those of the current PLMN selected by the user of the terminal. The EPLMN mainly solves problems of user residence and roaming strategy between a shared network and an original network. An operator can configure equivalent PLMNs. These networks can implement to share resources of communication networks. From the point of business, the resources of the communication networks can be shared between different operators or different PLMNs defined by the same operator. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009. The EPLMN list may include the network identification of the HPLMN and the network identification of the VPLMN added in advance. Alternatively, the EPLMN list may include the network identification of the EHPLMN and the network identification of the VPLMN added in advance. Alternatively, the EPLMN list may include the network identification of the HPLMN, the network identification of the EHPLMN, and the network identification of the VPLMN added in advance. The network identification of the VPLMN added in advance is equivalent to and has priority the same as an RPLMN which is registered before the terminal is turned off or out of service.

In step S108, a network is accessed according to the EPLMN list.

Specifically, when being moved from the home place to the visited place, the mobile communication terminal can receive a turn-on instruction from the user or an instruction of closing a current airplane mode. After being turned on or closing the current airplane mode, the mobile communication terminal starts a network searching. The mobile communication terminal may carry on the network searching according to the network identification in the EPLMN list. The mobile communication terminal scans the network identification of the VPLMN which can acquire broadcast from a base station. The mobile communication terminal can match the network identification of the PLMN acquired from the above-mentioned scanning with the network identification of the PLMN in the EPLMN list.

When the searching of the mobile communication terminal shows that the network identification of the VPLMN transmitted by a cell site matches with any one of the network identification in the EPLMN list, the mobile communication terminal may initiate a network registration and establish a communication connection with the network of the visited place.

Figure 3:
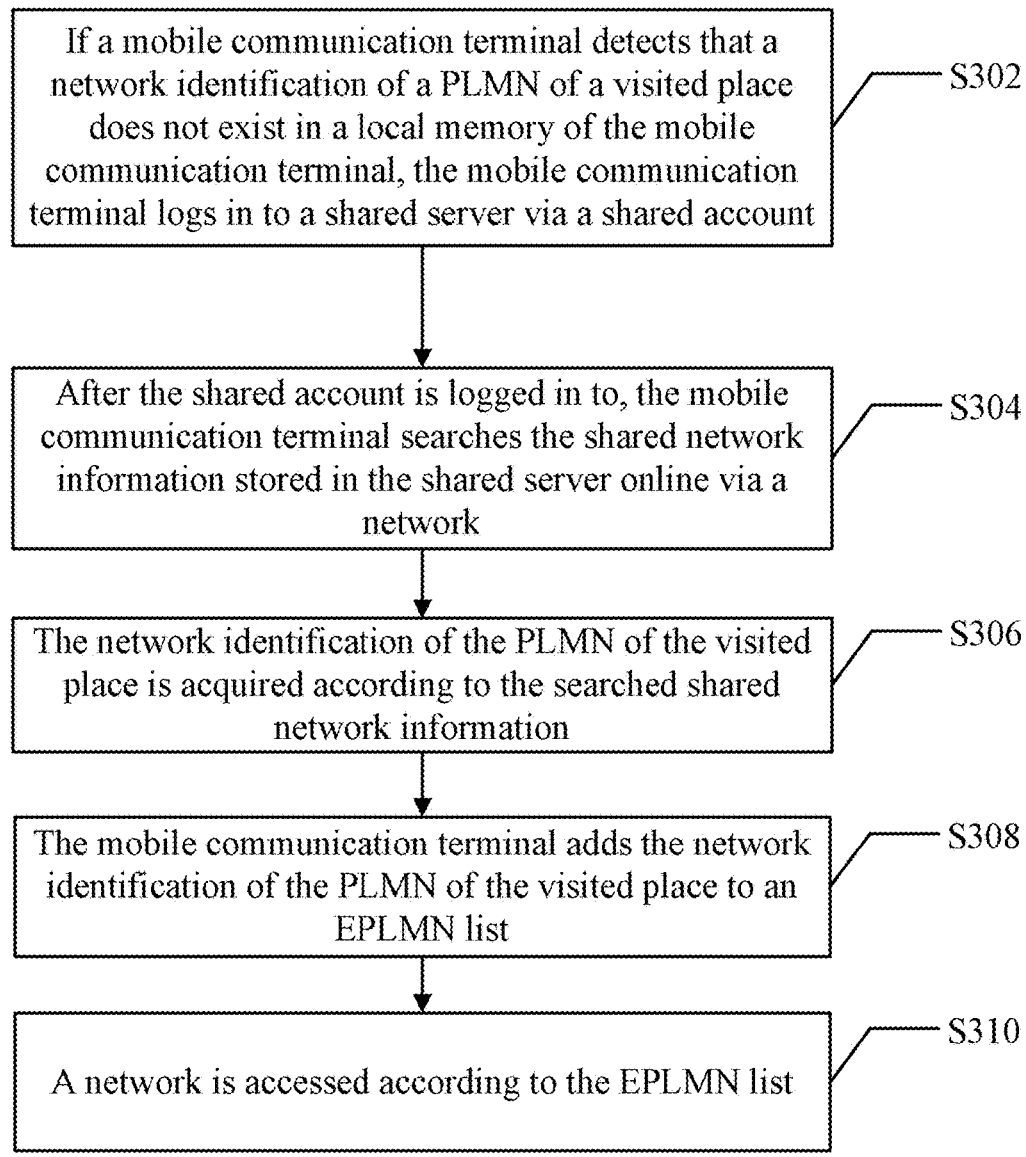
FIG. 3 is a schematic flowchart of another implementation manner of a network access method provided by an embodiment of the present disclosure.

Please refer to FIG. 3, which is a schematic flowchart of another implementation manner of a network access method provided by an embodiment of the present disclosure. The method includes the following steps.

In step S302, if a mobile communication terminal detects that a network identification of a PLMN of a visited place does not exist in a local memory of the mobile communication terminal, the mobile communication terminal logs in to a shared server via a shared account. Shared network information is stored in the shared server. The network identification of the PLMN of the visited place is a network identification of an operator of the visited place, which signs a roaming agreement with an operator of a home place to which a SIM card attached to the mobile communication terminal belongs. The network identification includes a network number.

Specifically, the mobile communication terminal may be a mobile phone. When the user travels or goes on a business trip abroad with the mobile communication terminal, a network of the mobile communication terminal enters an international roaming period. The visited place and the home place belong to different countries. The home place may be China, and the visited place may be, e.g., America or Korea. For instance, when the user travels with the mobile phone from China to America, the home place is China and the visited place is America. The network of the mobile phone is in an international roaming period. If the mobile communication terminal detects that the network identification of the PLMN of the visited place does not exist in the local memory of the mobile communication terminal, the mobile communication terminal can log in to the shared server via the shared account before reaching the visited place. The shared network information is stored in the shared server. The shared network information may include but not limited to HPLMN, EPLMN, and VPLMN. The network identification of the PLMN of the visited place is the network identification of the operator of the visited place, which signs the roaming agreement with the operator of the home place to which the subscriber identity module (SIM card) attached to the mobile communication terminal belongs. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009.

For instance, if it is detected that the PLMN does not exist in a local memory of a mobile phone, the mobile phone may log in to the shared server via the shared account. The shared network information is stored in the shared server.

In step S304, after the shared account is logged in to, the mobile communication terminal searches the shared network information stored in the shared server online via a network. The shared network information includes the network identification of the PLMN of the home place and the network identification of the PLMN of the visited place. The network identification of the PLMN of the home place corresponds to one or more of PLMNs of visited places.

Specifically, after logging in to the shared server in step S302, the mobile communication terminal may search the shared network information stored in the shared server online via the network. For instance, after the mobile phone logs in to the shared server via the shared account, the mobile phone may search the shared network information stored in the shared server online via the network.

In step S306, the network identification of the PLMN of the visited place is acquired according to the searched shared network information.

Specifically, the mobile communication terminal can acquire the network identification of the PLMN of the visited place according to the shared network information acquired in step S304. For instance, the mobile phone can acquire the VPLMN which signs a roaming agreement with an operator of the home place of the HPLMN or the EPLMN.

In step S308, the mobile communication terminal adds the network identification of the PLMN of the visited place to an EPLMN list. The EPLMN list includes the network identification of the PLMN of the home place and the network identification of the PLMN of the visited place. The network identification of the PLMN of the visited place is the network identification of the operator of the visited place, which signs the roaming agreement with the operator of the home place to which the SIM card attached to the mobile communication terminal belongs.

Specifically, the network identification of the VPLMN acquired in step S306 may be added to the EPLMN list. A schematic diagram of the EPLMN list is shown in FIG. 2. The EPLMN is a PLMN which has status and priority equivalent to those of the current PLMN selected by the user of the terminal. The EPLMN mainly solves problems of user residence and roaming strategy between a shared network and an original network. An operator can configure equivalent PLMNs. These networks can implement to share resources of communication networks. From the point of business, the resources of the communication networks can be shared between different operators or different PLMNs defined by the same operator. In the embodiment of the present disclosure, the network identification may include a network number. For instance, the CHINA MOBILE includes four network numbers: 46000, 46002, 46007, and 46008. The CHINA UNICOM includes three network numbers: 46001, 46006, and 46009. The EPLMN list may include the network identification of the HPLMN and the network identification of the VPLMN added in advance. Alternatively, the EPLMN list may include the network identification of the EHPLMN and the network identification of the VPLMN added in advance. Alternatively, the EPLMN list may include the network identification of the HPLMN, the network identification of the EHPLMN, and the network identification of the VPLMN added in advance. The network identification of the VPLMN added in advance is equivalent to and has priority the same as an RPLMN which is registered before the terminal is turned off or out of service.

In step S310, a network is accessed according to the EPLMN list.

Specifically, when being moved from the home place to the visited place, the mobile communication terminal can receive a turn-on instruction from the user or an instruction of closing a current airplane mode. After being turned on or closing the current airplane mode, the mobile communication terminal starts a network searching. The mobile communication terminal may carry on the network searching according to the network identification in the EPLMN list. The mobile communication terminal scans the network identification of the VPLMN which can acquire broadcast from a base station. The mobile communication terminal can match the network identification of the PLMN acquired from the above-mentioned scanning with the network identification of the PLMN in the EPLMN list.

When the searching of the mobile communication terminal shows that the network identification of the VPLMN transmitted by a cell site matches with any one of the network identification in the EPLMN list, the mobile communication terminal may initiate a network registration and establish a communication connection with the network of the visited place.

Figure 4:
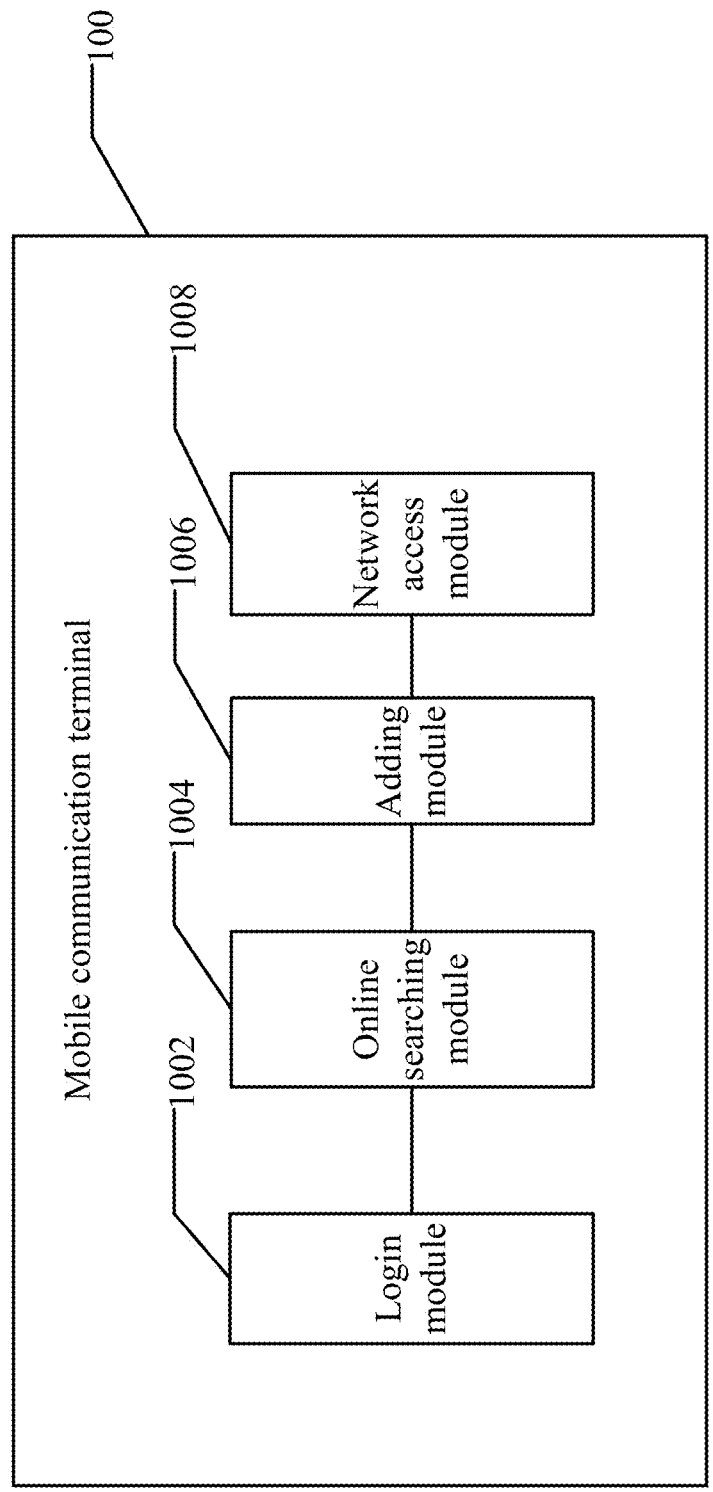
FIG. 4 is an illustrative block diagram of an implementation manner of a mobile communication terminal provided by an embodiment of the present disclosure.

Please refer to FIG. 4, which is an illustrative block diagram of an implementation manner of a mobile communication terminal provided by an embodiment of the present disclosure. As shown in FIG. 4, the mobile communication terminal 100 includes a login module 1002, an online searching module 1004, an adding module 1006, and a network access module 1008.

The login module 1002 is configured to logs in to a shared server if the mobile communication terminal detects that a network identification of a PLMN of a visited place does not exist in a local memory of the mobile communication terminal. Shared network information is stored in the shared server. The network identification of the PLMN of the visited place is a network identification of an operator of the visited place, which signs a roaming agreement with an operator of a home place to which a SIM card attached to the mobile communication terminal belongs. The network identification includes a network number.

The online searching module 1004 is configured to search the shared network information stored in the shared server online via a network and acquire the network identification of the PLMN of the visited place from the shared network information, after the login module 1002 logs in to the shared server.

The adding module 1006 is configured to add the network identification of the PLMN of the visited place searched by the online searching module 1004 to an EPLMN list. The EPLMN list includes the network identification of a PLMN of a home place and the network identification of the PLMN of the visited place. The network identification of the PLMN of the visited place is the network identification of the operator of the visited place, which signs the roaming agreement with the operator of the home place to which the SIM card attached to the mobile communication terminal belongs.

The network access module 1008 is configured to access a network according to the EPLMN list.

Figure 5:
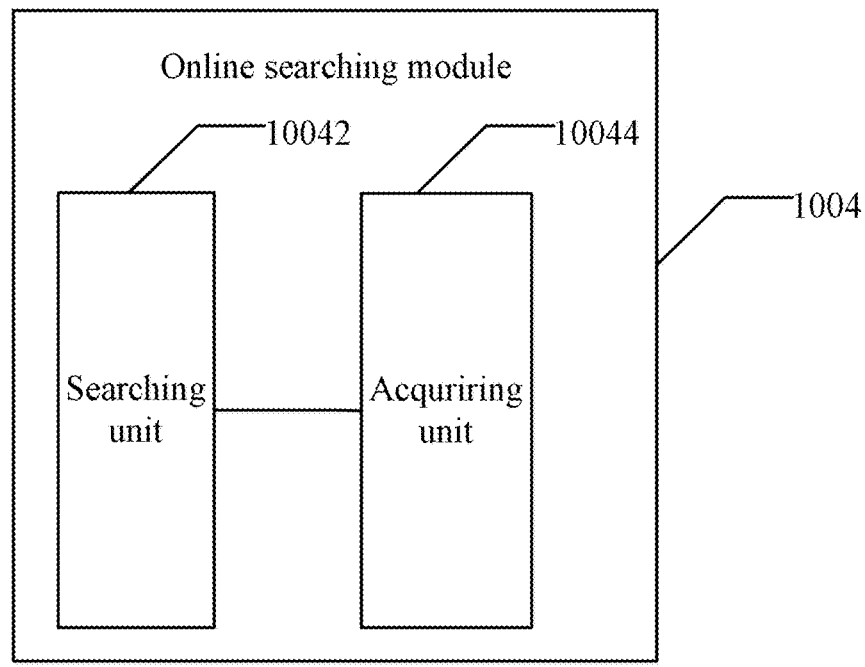
FIG. 5 is an illustrative block diagram of an implementation manner of an online searching module provided by an embodiment of the present disclosure.

Please refer to FIG. 5, which is an illustrative block diagram of an implementation manner of the online searching module provided by an embodiment of the present disclosure. As shown in FIG. 5, the online searching module 1004 may include a searching unit 10042 and an acquiring unit 10044.

The searching unit 10042 is configured to search the shared network information online via a network, after the login module 1002 performs the login of the shared account. The shared network information includes the network identification of the PLMN of the home place and the network identification of the PLMN of the visited place. The network identification of the PLMN of the home place corresponds to one or more of PLMNs of visited places.

The acquiring unit 10044 is configured to acquire the network identification of the PLMN of the visited place according to the searched shared network information.

Figure 6:
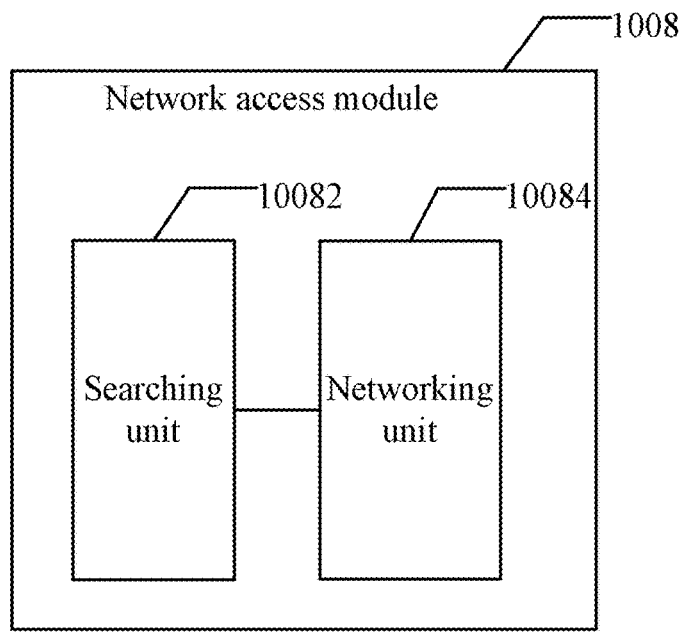
FIG. 6 is an illustrative block diagram of an implementation manner of a network access module provided by an embodiment of the present disclosure.

Please refer to FIG. 6, which is an illustrative block diagram of an implementation manner of the network access module provided by an embodiment of the present disclosure. As shown in FIG. 6, the network access module 1008 may include a searching unit 10082 and a networking unit 10084.

The searching unit 10082 is configured to search the network in the visited place.

The networking unit 10084 is configured to establish, if the PLMN of the visited place matching with the network identification in the EPLMN list is searched in the visited place by the searching unit 10082, a communication connection between the mobile communication terminal and the matching PLMN of the visited place.

Figure 7:
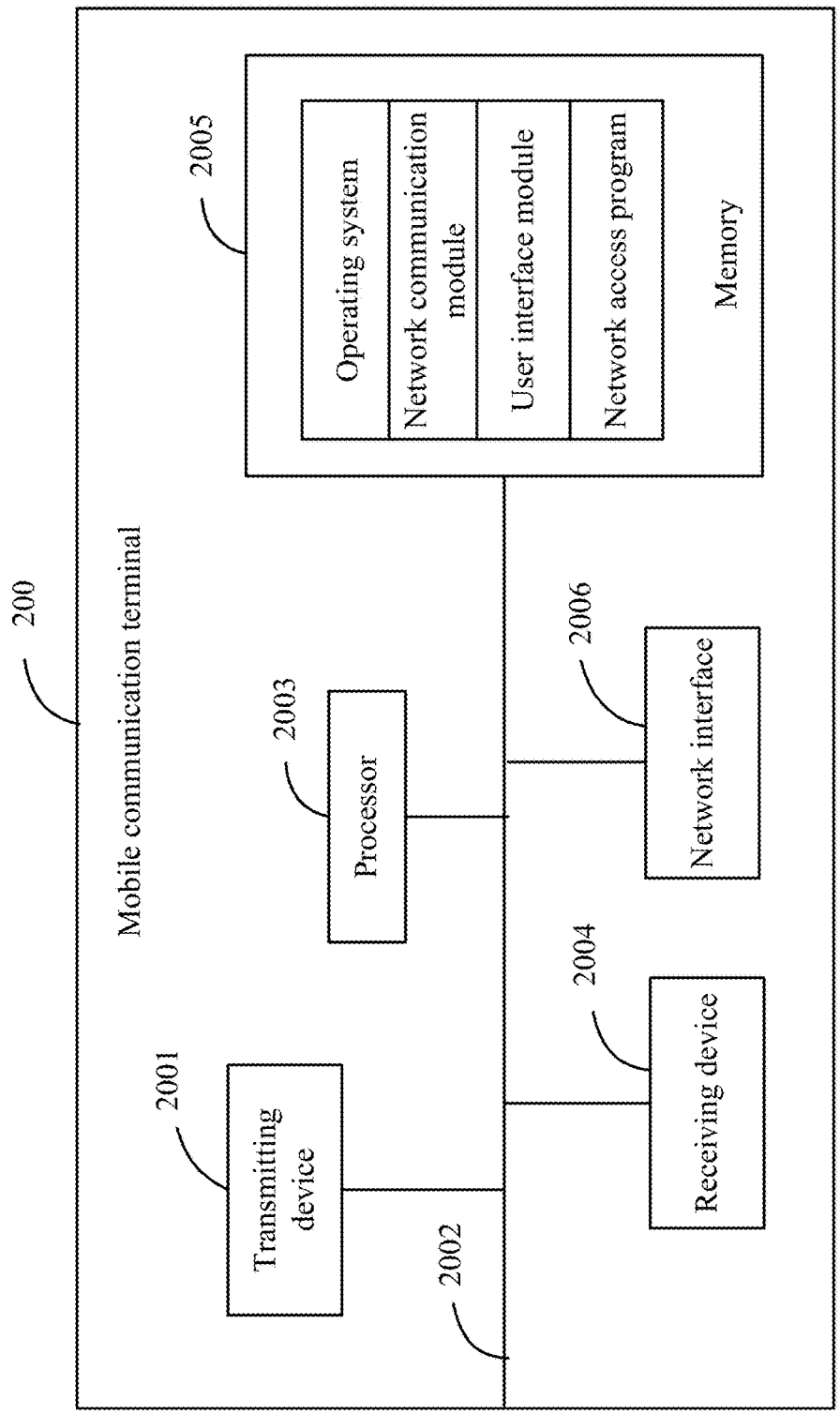
FIG. 7 is an illustrative block diagram of another implementation manner of a mobile communication terminal provided by an embodiment of the present disclosure.

Further, please refer to FIG. 7. FIG. 7 is an illustrative block diagram of another implementation manner of a mobile communication terminal provided by an embodiment of the present disclosure. As shown in FIG. 7, the mobile communication terminal 200 may include a transmitting device 2001, at least one communication bus 2002, at least one processor 2003 (e.g., at least one CPU), a receiving device 2004, a memory 2005, and at least one network interface 2006. The communication bus 2002 is configured to implement connections and communications among these components. The network interface may optionally include a standard wireless interface, e.g., a WIFI interface, a BLUETOOTH interface, or an infrared interface. The memory 2005 may be a high-speed RAM or may be a non-volatile memory, e.g., at least one magnetic disk memory. Optionally, the memory 2005 may be a storing system away from the above-mentioned processor 2003. The memory 2005 serving as a computer storage medium may include an operating system, a network communication module, a user interface module, and a network access program.

In the mobile communication terminal 200 in FIG. 7, the network interface 2006 is mainly configured to connect to a shared server and perform data communication with the shared server. The processor 2003 may be configured to call the network access program stored in the memory 2005 and perform the following operations.

If it is detected that a network identification of a PLMN of a visited place does not exist in a local memory of a mobile communication terminal, the mobile communication terminal logs in to a shared server via a shared account. Shared network information is stored in the shared server. The network identification of the PLMN of the visited place is a network identification of an operator of the visited place, which signs a roaming agreement with an operator of a home place to which a SIM card attached to the mobile communication terminal belongs. The network identification includes a network number.

After the shared server is logged in to, the shared network information in the shared server is searched online via a network and the network identification of the PLMN of the visited place is acquired from the shared network information.

The network identification of the PLMN of the visited place is added to an EPLMN list. The EPLMN list includes the network identification of the PLMN of the home place and the network identification of the PLMN of the visited place. The network identification of the PLMN of the visited place is the network identification of the operator of the visited place, which signs the roaming agreement with the operator of the home place to which the SIM card attached to the mobile communication terminal belongs.

A network is accessed according to the EPLMN list.

Further, the searching the shared network information in the shared server online via the network and acquiring the network identification of the PLMN of the visited place from the shared network information specifically include the following operations.

After the shared account is logged in to, the shared network information is searched online via the network. For instance, after the mobile phone logs in to the shared server via the shared account, the mobile phone may search the shared network information stored in the shared server online via the network. The shared network information includes the network identification of the PLMN of the home place and the network identification of the PLMN of the visited place. The network identification of the PLMN of the home place corresponds to one or more of PLMNs of visited places.

The network identification of the PLMN of the visited place is acquired according to the searched shared network information.

Further, the accessing the network according to the EPLMN list includes the following operations.

The network is searched in the visited place.

If the PLMN of the visited place matching with the network identification in the EPLMN list is searched in the visited place by the searching unit 10082, a communication connection is established between the mobile communication terminal and the matching PLMN of the visited place.

Further, the network identification of the PLMN of the visited place is equivalent to a network identification of a registered PLMN which the mobile communication terminal searches firstly.

Further, the visited place and the home place belong to different countries or different administrative regions.

It can be understood that the embodiments of FIG. 4 to FIG. 7 may be referred to the embodiments of the network access method of FIG. 1 to FIG. 3 and not repeated herein.

In summary, a network access method and a mobile communication terminal are provided by implementing the embodiments of the present disclosure. Not only a network identification of a home PLMN of the mobile communication terminal but also an acquired network identification of a PLMN of an operator, which signs a roaming agreement with an operator of the home PLMN, is added to the EPLMN list. The PLMNs in the ELPMN list in which the network identifications are stored are regarded to be equivalent. As a result, a network of the mobile communication terminal can be accessed according to the EPLMN list because the network identifications of the PLMNs of operators of the visited places, which sign a roaming agreement with the operator of the home PLMN, are stored in the EPLMN list. Accordingly, when the mobile communication terminal is moved from a home place to a visited place and performs a network searching, possibility of matching with any one of the PLMNs in the EPLMN list storing the network identifications is significantly increased during the network searching. A success rate and speed can be increased when the mobile communication terminal is accessed to the network of the visited place. This is beneficial to shorten a user's waiting time significantly (in an ideal state, the mobile communication terminal may be accessed to the network within several seconds), thereby enhancing the user's communication experiences.

It should be noted that those skilled in the art may understand all or some of the processes in the methods of the embodiments described above can be realized by using computer programs to instruct corresponding hardware. The programs may be stored in a computer readable storage medium. When the programs are executed, the processes in the methods of the above embodiments may be performed. The storage medium may be disk, compact disc (CD), read-only memory (ROM), random access memory (RAM) or the like.

The above description is merely the specific embodiments of the present disclosure, but the protection scope of the present disclosure is not limited thereto, any skilled who is familiar with this art could readily conceive variations or substitutions within the disclosed technical scope disclosed by the present disclosure, and these variations or substitutions shall be encompassed in the protection scope of the present disclosure. Thus, the protection scope of the present disclosure shall be subjected to the protection scope of the claims.

What is claimed is:

1. A network access method, comprising:
   logging in to, before a mobile communication terminal reaches a visited place, a shared server via a shared account in response to a network identification of a public land mobile network (PLMN) of the visited place not existing in a local memory of the mobile communication terminal, the local memory being different from a subscriber identity module (SIM) card of the mobile communication terminal, wherein shared network information is stored in the shared server, and the network identification of the PLMN of the visited place is a network identification of an operator of the visited place, which signs a roaming agreement with an operator of a home place to which the subscriber identity module attached to the mobile communication terminal belongs;
   searching, before the mobile communication terminal reaches the visited place, to acquire the network identification of the PLMN of the visited place from the shared network information;
   adding, before the mobile communication terminal reaches the visited place, the network identification of the PLMN of the visited place to an equivalent PLMN (EPLMN) list by the mobile communication terminal, wherein the EPLMN list is stored in the mobile communication terminal and comprises the network identification of the PLMN of the home place and the network identification of the PLMN of the visited place; and
   accessing a network according to the EPLMN list after the mobile communication terminal is moved from the home place to the visited place.

2. The method of claim 1, wherein the searching to acquire the network identification of the PLMN of the visited place from the shared network information comprises:
   searching the shared network information online via a network, after the shared account is logged in to, wherein the shared network information comprises the network identification of the PLMN of the home place and the network identification of the PLMN of the visited place, and the network identification of the PLMN of the home place corresponds to the network identification of the operator of the home place; and acquiring the network identification of the PLMN of the visited place according to the searched shared network information.

3. The method of claim 1, wherein the accessing the network according to the EPLMN list comprises:

searching the network in the visited place by the mobile communication terminal; and establishing, in response to searching the PLMN of the visited place in the visited place matching with the network identification in the EPLMN list, a communication connection between the mobile communication terminal and the matching PLMN of the visited place.

4. The method of claim 1, wherein the network identification of the PLMN of the visited place is equivalent to a network identification of a registered PLMN which the mobile communication terminal searches firstly.

5. The method of claim 1, wherein the visited place and the home place belong to different countries or different administrative regions.

6. A mobile communication terminal, comprising:

a memory configured to store computer readable program codes; and a processor configured to execute the computer readable program codes to perform the following operations:

logging in to, before the mobile communication terminal reaches a visited place, a shared server via a shared account in response to a network identification of a public land mobile network (PLMN) of the visited place not existing in a local memory of the mobile communication terminal, the local memory being different from a subscriber identity module (SIM) card of the mobile communication terminal, wherein shared network information is stored in the shared server, and the network identification of the PLMN of the visited place is a network identification of an operator of the visited place, which signs a roaming agreement with an operator of a home place to which the subscriber identity module attached to the mobile communication terminal belongs;

searching, before the mobile communication terminal reaches the visited place, to acquire the network identification of the PLMN of the visited place from the shared network information;

adding, before the mobile communication terminal reaches the visited place, the searched network identification of the PLMN of the visited place to an equivalent PLMN (EPLMN) list, wherein the EPLMN list is stored in the mobile communication terminal and comprises the network identification of the PLMN of the home place and the network identification of the PLMN of the visited place; and accessing a network according to the EPLMN list after the mobile communication terminal is moved from the home place to the visited place.

7. The mobile communication terminal of claim 6, wherein the searching to acquire the network identification of the PLMN of the visited place from the shared network information comprises:

searching the shared network information online via a network, after the shared account is logged in to, wherein the shared network information comprises the network identification of the PLMN of the home place and the network identification of the PLMN of the visited place, and the network identification of the PLMN of the home place corresponds to the network identification of the operator of the home place; and acquiring the network identification of the PLMN of the visited place according to the searched shared network information.

8. The mobile communication terminal of claim 6, wherein the accessing the network according to the EPLMN list comprises:

searching the network in the visited place; and establishing, in response to searching the PLMN of the visited place in the visited place matching with the network identification in the EPLMN list, a communication connection between the mobile communication terminal and the matching PLMN of the visited place.

9. The mobile communication terminal of claim 6, wherein the network identification of the PLMN of the visited place is equivalent to a network identification of a registered PLMN which the mobile communication terminal searches firstly.

10. The mobile communication terminal of claim 6, wherein the visited place and the home place belong to different countries or different administrative regions.

11. A non-transitory computer readable storage medium, stored with computer readable program codes, the computer readable program codes being operated in a mobile communication terminal for:

logging in to, before the mobile communication terminal reaches a visited place, a shared server via a shared account in response to a network identification of a public land mobile network (PLMN) of the visited place not existing in a local memory of the mobile communication terminal, the local memory being different from a subscriber identity module (SIM) card of the mobile communication terminal, wherein shared network information is stored in the shared server, and the network identification of the PLMN of the visited place is a network identification of an operator of the visited place, which signs a roaming agreement with an operator of a home place to which the subscriber identity module attached to the mobile communication terminal belongs;

searching, before the mobile communication terminal reaches the visited place, to acquire the network identification of the PLMN of the visited place from the shared network information;

adding, before the mobile communication terminal reaches the visited place, the searched network identification of the PLMN of the visited place to an equivalent PLMN (EPLMN) list, wherein the EPLMN list is stored in the mobile communication terminal and comprises the network identification of the PLMN of the home place and the network identification of the PLMN of the visited place; and accessing a network according to the EPLMN list after the mobile communication terminal is moved from the home place to the visited place.

12. The non-transitory computer readable storage medium of claim 11, wherein the searching to acquire the network identification of the PLMN of the visited place from the shared network information comprises:

searching the shared network information online via a network, after the shared account is logged in to, wherein the shared network information comprises the network identification of the PLMN of the home place and the network identification of the PLMN of the visited place, and the network identification of the PLMN of the home place corresponds to the network identification of the operator of the home place; and acquiring the network identification of the PLMN of the visited place according to the searched shared network information.

13. The non-transitory computer readable storage medium of claim 11, wherein the accessing the network according to the EPLMN list comprises:

searching the network in the visited place; and establishing, in response to searching the PLMN of the visited place in the visited place matching with the network identification in the EPLMN list, a communication connection between the mobile communication terminal and the matching PLMN of the visited place.

14. The non-transitory computer readable storage medium of claim 11, wherein the network identification of the PLMN of the visited place is equivalent to a network identification of a registered PLMN which the mobile communication terminal searches firstly.

15. The non-transitory computer readable storage medium of claim 11, wherein the visited place and the home place belong to different countries or different administrative regions.

* * * * *